(12) United States Patent
Utschig et al.

(10) Patent No.: US 10,428,708 B2
(45) Date of Patent: Oct. 1, 2019

(54) CATALYST FOR REDUCTION OF NITROGEN OXIDES

(71) Applicant: UMICORE AG & CO. KG, Hanau-Wolfgang (DE)

(72) Inventors: Thomas Utschig, Frankfurt am Main (DE); Ruediger Hoyer, Alzenau-Hoerstein (DE); Elena Mueller, Pfungstadt (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 46 days.

(21) Appl. No.: 15/327,512

(22) PCT Filed: Aug. 4, 2015

(86) PCT No.: PCT/EP2015/067883
§ 371 (c)(1),
(2) Date: Jan. 19, 2017

(87) PCT Pub. No.: WO2016/020351
PCT Pub. Date: Feb. 11, 2016

(65) Prior Publication Data
US 2017/0183995 A1 Jun. 29, 2017

(30) Foreign Application Priority Data
Aug. 5, 2014 (EP) .................... 14179780

(51) Int. Cl.
*B01J 23/58* (2006.01)
*F01N 3/08* (2006.01)
(Continued)

(52) U.S. Cl.
CPC ....... *F01N 3/0842* (2013.01); *B01D 53/9422* (2013.01); *B01J 23/002* (2013.01);
(Continued)

(58) Field of Classification Search
None
See application file for complete search history.

(56) References Cited

U.S. PATENT DOCUMENTS 8,337,791 B2 * 12/2012 Kohara ................ B01D 53/945
423/213.2
8,475,752 B2   7/2013 Wan
(Continued)

FOREIGN PATENT DOCUMENTS

CN      102089066 A     6/2011
CN      102740953 A    10/2012
(Continued)

OTHER PUBLICATIONS

Written Opinion for the Internationals Searching Authority dated Feb. 11, 2016 for PCT/EP2015/067883 (15 pages—German with English machine translation).
(Continued)

*Primary Examiner* — Anita Nassiri-Motlagh
(74) *Attorney, Agent, or Firm* — Smith, Gambrell & Russell, LLP

(57) ABSTRACT

The present invention relates to a nitrogen oxide storage catalyst composed of at least two catalytically active washcoat layers on a support body, wherein a lower washcoat layer A comprises cerium oxide, an alkaline earth metal compound and/or an alkali metal compound, and platinum and palladium, and an upper washcoat layer B disposed atop the washcoat layer A comprises cerium oxide, platinum and palladium, and no alkali metal or alkaline earth metal compound, and to a method of converting $NO_x$ in exhaust gases from motor vehicles which are operated with lean-burn engines.

19 Claims, 1 Drawing Sheet

(51) Int. Cl.
    *B01J 37/02* (2006.01)
    *B01J 23/00* (2006.01)
    *B01J 23/63* (2006.01)
    *B01J 35/04* (2006.01)
    *B01D 53/94* (2006.01)

(52) U.S. Cl.
    CPC ............... *B01J 23/58* (2013.01); *B01J 23/63* (2013.01); *B01J 35/04* (2013.01); *B01J 37/0244* (2013.01); *B01D 2255/1021* (2013.01); *B01D 2255/1023* (2013.01); *B01D 2255/1025* (2013.01); *B01D 2255/2042* (2013.01); *B01D 2255/2047* (2013.01); *B01D 2255/2063* (2013.01); *B01D 2255/2065* (2013.01); *B01D 2255/2092* (2013.01); *B01D 2255/9022* (2013.01); *B01D 2255/91* (2013.01); *B01D 2258/012* (2013.01); *B01J 2523/00* (2013.01); *F01N 2510/0684* (2013.01)

(56) References Cited

U.S. PATENT DOCUMENTS

| | | | |
|---|---|---|---|
| 2009/0320457 | A1 | 12/2009 | Wan |
| 2011/0154807 | A1 | 6/2011 | Chandler et al. |
| 2013/0089481 | A1* | 4/2013 | Sumiya ................ B01J 37/0244 423/213.5 |
| 2015/0336085 | A1 | 11/2015 | Hoyer et al. |
| 2017/0043322 | A1 | 2/2017 | Chandler et al. |

FOREIGN PATENT DOCUMENTS

| | | |
|---|---|---|
| CN | 103189138 A | 7/2013 |
| EP | 0885650 A2 | 12/1998 |
| JP | 2011-526203 A | 10/2011 |
| JP | 2013-536756 A | 9/2013 |
| WO | 2012/029050 A1 | 3/2012 |
| WO | 2014/108362 A1 | 7/2014 |

OTHER PUBLICATIONS

International Preliminary Report on Patentability dated Feb. 7, 2017 for PCT/EP2015/067883 (17 pages—German with English machine translation).
International Search Report for PCT/EP2015/067883, dated Aug. 31, 2015 in English and German Language.
SAE Technical Paper Series 950604, Feb. 27-Mar. 2, 1965, pp. 121-130. Development of New Concept Three-Way Catalyst for Automotive Lean-Burn Engines, N. Miyoshi, et al.
Chinese Office Action dated Mar. 22, 2019 for CN 201580041955.4 (7 pages in Chinese with English translation).
Japanese Office Action dated Jun. 17, 2019 for JP 2017-503871 (3 pages in Japanese with English translation).
European Office Action dated Jun. 19, 2019 for EP 15 745 210.3 (7 pages in German with Machine translation).
European Office Action dated Jun. 11, 2019 for EP 14 179 780.3 (7 pages in German with Machine translation).
Sasol. Doped Aluminas Silica-Aluminas Mixed Metal Oxides Hydrotalcites. Sasol Performance Chemicals. Jul. 4, 2016. 16 pages.

* cited by examiner

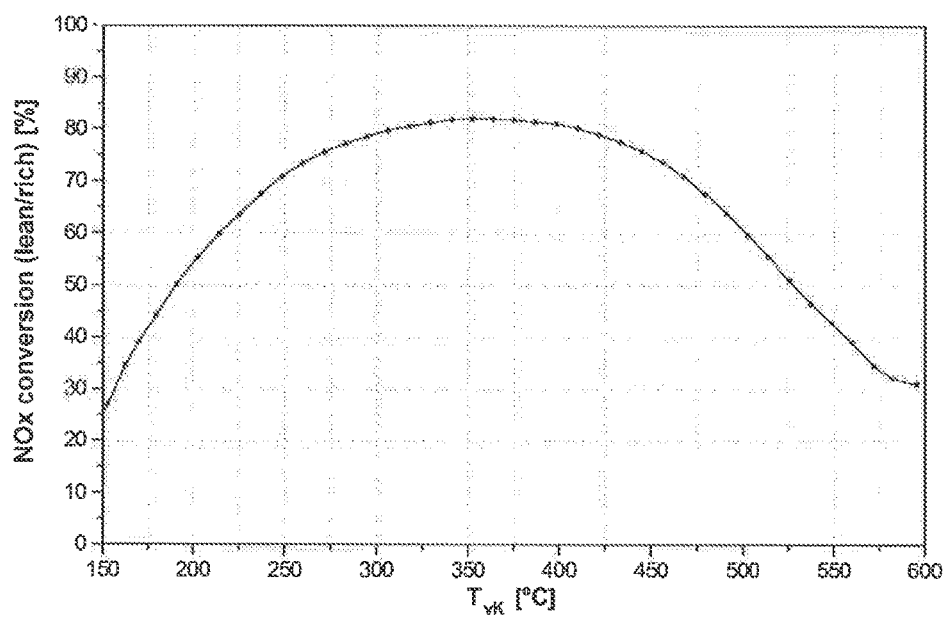

CATALYST FOR REDUCTION OF NITROGEN OXIDES

The present invention relates to a catalyst for the reduction of nitrogen oxides contained in the exhaust gas of lean-burn combustion engines.

The exhaust gas of motor vehicles that are operated with lean-burn combustion engines, such as diesel engines, also contain, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these include particle emissions, also referred to as "diesel soot" or "soot particles." These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean these exhaust gases, the aforementioned components must be converted to harmless compounds as completely as possible. This is only possible with the use of suitable catalysts.

In order to remove the nitrogen oxides, so-called nitrogen oxide storage catalysts are known, for which the term "Lean NOx Trap," or LNT, is common. Their cleaning action is based upon the fact that in a lean operating phase of the engine, the nitrogen oxides are predominantly stored in the form of nitrates by the storage material of the storage catalyst, and the nitrates are broken down again in a subsequent rich operating phase of the engine, and the nitrogen oxides which are thereby released are converted with the reducing exhaust gas components in the storage catalyst to nitrogen, carbon dioxide, and water. This operating principle is described in, for example, SAE document SAE 950809.

As storage materials, oxides, carbonates, or hydroxides of magnesium, calcium, strontium, barium, alkali metals, rare-earth metals, or mixtures thereof come, in particular, into consideration. As a result of their alkaline properties, these compounds are able to form nitrates with the acidic nitrogen oxides of the exhaust gas and to store them in this way. They are deposited in the most highly dispersed form possible on suitable substrate materials in order to produce a large interaction surface with the exhaust gas. In addition, nitrogen oxide storage catalysts generally contain noble metals such as platinum, palladium, and/or rhodium as catalytically active components. It is their purpose, on the one hand, to oxidize NO to $NO_2$, as well as CO and HC to $CO_2$, under lean conditions and, on the other hand, to reduce released $NO_2$ to nitrogen during the rich operating phases, in which the nitrogen oxide storage catalyst is regenerated.

With the change in the emission regulations according to Euro 6, future exhaust gas systems will have to exhibit sufficient $NO_x$ conversion, both at low temperatures in urban cycles and at high temperatures, as occur with high loads. Known nitrogen oxide storage catalysts, however, do not show a marked $NO_x$ storage at low or high temperatures. A good $NO_x$ conversion across a broad temperature range of 200 to 450° C., which is essential in order to fulfill future emission regulations, cannot yet be achieved.

EP 0 885 650 A2 describes an exhaust gas purification catalyst for combustion engines with two catalytically active layers on a support body. The layer located on the support body comprises one or more highly dispersed alkaline earth metal oxides, at least one platinum group metal, and at least one fine-particle, oxygen-storing material. In this case, the platinum group metals are in close contact with all components of the first layer. The second layer is in direct contact with the exhaust gas and contains at least one platinum group metal, as well as at least one fine-particle, oxygen-storing material. Only a portion of the fine-particle particulate matter of the second layer is used as substrate for the platinum group metal. The catalyst is a three-way catalyst that substantially converts the harmful exhaust gas components under stoichiometric conditions, i.e., at the air/fuel ratio λ of 1.

From US2009/320457, a nitrogen oxide storage catalyst is known that comprises two superimposed catalyst layers on a support substrate. The lower layer located directly on the support substrate comprises one or more noble metals, as well as one or more nitrogen oxide storage components. The upper layer comprises one or more noble metals, as well as cerium oxide, and is free of alkali metal components or alkaline earth metal components.

Catalyst substrates that contain nitrogen oxide storage materials and have two or more layers are also described in WO 2012/029050. The first layer is located directly on the support substrate and comprises platinum and/or palladium, whereas the second layer is located on the first layer and comprises platinum. Both layers additionally contain one or more oxygen storage materials and one or more nitrogen oxide storage materials that comprise one or more alkali metals and/or alkaline earth metals. The total quantity of alkali metal and alkaline earth metal in the nitrogen oxide storage materials is 11.25 to 156.25 kg/m³ (0.18 to 2.5 g/in³), calculated as alkali metal oxide $M_2O$ and alkaline earth metal oxide MO.

WO2014/108362 also discloses a two-layer nitrogen oxide storage catalyst, wherein the lower layer does not contain any alkaline earth metal compounds, and the upper layer contains alkaline magnesium-aluminum mixed oxide.

The present invention relates to a nitrogen oxide storage catalyst composed of at least two catalytically active washcoat layers on a support body, wherein a lower washcoat layer A contains cerium oxide in a quantity of 110 to 180 kg/m³ (110 to 180 g/L) in relation to the volume of the support body, an alkaline earth metal compound and/or an alkali metal compound, as well as platinum and palladium;

an upper washcoat layer B disposed atop the washcoat layer A contains cerium oxide, as well as platinum and palladium, and no alkali metal or alkaline earth metal compounds;

the ratio of the cerium oxide in washcoat layer A to the cerium oxide in washcoat layer B, calculated respectively in kg/m³ (g/L), in relation to the volume of the support body, is 1:1 to 5:1, wherein the total quantity of cerium oxide in washcoat layer A and washcoat layer B, calculated in kg/m³ (g/L) and in relation to the volume of the support body is 132 to 240 kg/m³ (132 to 240 g/L);

the ratio Pt:Pd, calculated respectively in kg/m³ (g/L), in relation to the volume of the support body, in washcoat layer A and washcoat layer B is equal and amounts to 2:1 to 20:1;

the total quantity of platinum and palladium, calculated respectively in kg/m³ (g/L) and in relation to the volume of the support body, in washcoat layer A and washcoat layer B is equal; and the ratio of the concentrations of platinum and palladium in washcoat layer A to platinum and palladium in washcoat layer B, respectively in relation to the total mass of the respective washcoat layer, calculated respectively in kg/m³ (g/L), in relation to the volume of the support body, is 1:1 to 1:5.

The cerium oxide used in washcoat layers A and B can be of a commercially available quality, i.e., have a cerium oxide content of 90 to 100 wt %.

In one embodiment of the present invention, cerium oxide is used in washcoat layer A in a quantity of 110 to 160 kg/m³ (110 to 160 g/L)—for example, 125 to 145 kg/m³ (125 to 145 g/L). In washcoat layer B, cerium oxide is used in quantities of 22 to 120 kg/m³ (22 to 120 g/L)—for example, 40 to 100 kg/m³ (40 to 100 g/L) or 45 to 65 kg/m³ (45 to 65 g/L).

The total washcoat loading of the support body in embodiments of the present invention is 300 to 600 kg/m³ (300 to 600 g/L), in relation to the volume of the support body. It follows that the loading with washcoat layer A is 150 to 500 kg/m³ (150 to 500 g/L) and the loading with washcoat layer B is 50 to 300 kg/m³ (50 to 300 g/L), respectively in relation to the volume of the support body.

In further embodiments of the invention, the loading with washcoat layer A is 250 to 300 kg/m³ (250 to 300 g/L) and with washcoat layer B is 50 to 150 kg/m³ (50 to 150 g/L), respectively in relation to the volume of the support body.

The ratio of platinum to palladium is the same in washcoat layers A and B and, for example, amounts to 4:1 to 18:1 or 6:1 to 16:1, e.g., 8:1, 10:1, 12:1, or 14:1 in embodiments of the present invention.

In embodiments of the present invention, washcoat layer A and/or washcoat layer B contain rhodium as an additional noble metal. In this case, rhodium is provided, in particular, in quantities of 0.003 to 0.35 kg/m³ (0.1 to 10 g/ft³ (corresponding to 0.003 to 0.35 g/L)), in relation to the volume of the support body.

Both in the washcoat layer A and in the washcoat layer B, the noble metals platinum and palladium, and possibly rhodium, are generally provided on suitable substrate materials. As such are used large-surface, high-melting oxides, such as aluminum oxide, silicon dioxide, titanium dioxide, but also mixed oxides, such as aluminum-silicon mixed oxide and cerium-zirconium mixed oxide.

In embodiments of the present invention, aluminum oxide, especially such as is stabilized by 1 to 6 wt %—in particular, 4 wt %—lanthanum oxide, is used as substrate material for the noble metals.

It is preferred that the noble metals platinum, palladium, or rhodium be supported by only one or more of the aforementioned substrate materials, and thus not in close contact with all components of the respective washcoat layer.

As alkaline earth metal compound in washcoat layer A, oxides, carbonates, or hydroxides of magnesium, strontium, and barium—especially, magnesium oxide, barium oxide, and strontium oxide—come, in particular, into consideration.

As alkali metal compound in washcoat layer A, oxides, carbonates, or hydroxides of lithium, potassium, and sodium come, in particular, into consideration.

In embodiments of the present invention, the alkaline earth metal compound or alkali metal compound is provided in quantities of 10 to 50 kg/m³ (10 to 50 g/L)—in particular, 15 to 20 kg/m³ (15 to 20 g/L)—calculated as alkaline earth metal oxide or alkali metal oxide.

In embodiments of the present invention, the nitrogen oxide storage catalyst does not contain any alkaline magnesium-aluminum mixed oxide.

In a preferred embodiment, the present invention relates to a nitrogen oxide storage catalyst composed of at least two catalytically active washcoat layers on a support body, wherein
  a lower washcoat layer A contains
    cerium oxide in a quantity of 100 to 160 kg/m³ (100 to 160 g/L),
    platinum and palladium in a mass ratio of 10:1, and
    magnesium oxide and/or barium oxide; and
  an upper washcoat layer B is disposed atop the washcoat layer A and contains
    no alkaline earth metal compound and no alkali metal compound,
    platinum and palladium in a mass ratio of 10:1, and
    cerium oxide in a quantity of 45 to 65 kg/m³ (45 to 65 g/L),
wherein washcoat layer A is provided in quantities of 250 to 350 kg/m³ (250 to 350 g/L) and washcoat layer B is provided in quantities of 80 to 130 kg/m³ (80 to 130 g/L), and wherein the specification of quantity kg/m³ (g/L) respectively relates to the volume of the support body.

The application of the catalytically active washcoat layers A and B to the support body takes place in accordance with the customary dip coating methods or pump and suck coating methods with subsequent thermal post-treatment (calcination and possibly reduction using forming gas or hydrogen). These methods are sufficiently known from the prior art.

The nitrogen oxide storage catalysts according to the invention are outstandingly suitable for the conversion of $NO_x$ in exhaust gases of motor vehicles that are operated with lean-burn engines, such as diesel engines. They achieve a good NOx conversion at temperatures of approx. 200 to 450° C., without the NOx conversion being negatively affected at high temperatures. Surprisingly, they are superior to the catalysts known from WO 2014/108362 at temperatures of T<300° C. Thus, FIG. 2a) of WO2014/108362 shows an NOx conversion of the catalyst K1 at 250° C. of 50%, whereas, according to example 1 below, the catalyst K1 according to the invention already achieves this conversion considerably below 200° C.; see FIG. 1. The nitrogen oxide storage catalysts according to the invention are thus suitable for Euro 6 applications.

The present invention thus also relates to a method of converting $NO_x$ in exhaust gases of motor vehicles that are operated with lean-burn engines, such as diesel engines, which method is characterized in that the exhaust gas is guided over a nitrogen oxide storage catalyst composed of at least two catalytically active washcoat layers on a support body, wherein
  a lower washcoat layer A contains cerium oxide in a quantity of 110 to 180 kg/m³ (110 to 180 g/L) in relation to the volume of the support body, an alkaline earth metal compound and/or an alkali metal compound, as well as platinum and palladium;
  an upper washcoat layer B disposed atop the washcoat layer A contains cerium oxide, as well as platinum and palladium, and no alkali metal or alkaline earth metal compounds;
  the ratio of the cerium oxide in washcoat layer A to the cerium oxide in washcoat layer B, calculated respectively in kg/m³ (g/L), in relation to the volume of the support body, is 1:1 to 5:1, wherein the total quantity of cerium oxide in washcoat layer A and washcoat layer B, calculated in kg/m³ (g/L) and in relation to the volume of the support body, is 132 to 240 kg/m³ (132 to 240 g/L);

the ratio Pt:Pd, calculated respectively in kg/m³ (g/L), in relation to the volume of the support body, in washcoat layer A and washcoat layer B is equal and amounts to 2:1 to 20:1;

the total quantity of platinum and palladium, calculated respectively in kg/m³ (g/L) and in relation to the volume of the support body, in washcoat layer A and washcoat layer B is equal; and the ratio of the concentrations of platinum and palladium in washcoat layer A to platinum and palladium in washcoat layer B, respectively in relation to the total mass of the respective washcoat layer, calculated respectively in kg/m³ (g/L), in relation to the volume of the support body, is 1:1 to 1:5.

Embodiments of the method according to the invention with respect to the nitrogen oxide storage catalyst correspond to the descriptions above.

The invention is explained in more detail in the examples and figures below.

FIG. 1: NOx conversion of catalyst K1 as a function of the temperature.

EXAMPLE 1

In order to produce a catalyst according to the invention, a honeycombed ceramic substrate is coated with a first washcoat layer A, which contains Pt, Pd, and Rh supported on an alumina stabilized by lanthanum, cerium oxide in a quantity of 125 kg/m³ (125 g/L), as well as 20 kg/m³ (20 g/L) barium oxide and 15 kg/m³ (15 g/L) magnesium oxide. In this case, the loading of Pt and Pd amounts to 1.766 kg/m³ (1.766 g/L (50 g/cft)) and 0.177 kg/m³ (0.177 g/L (5 g/cft)), and the total loading of the washcoat layer is 300 kg/m³ (300 g/L) in relation to the volume of the ceramic substrate. Another washcoat layer B, which also contains Pt and Pd as well as Rh supported on an alumina stabilized by lanthanum, is applied to the first washcoat layer. The loading of Pt, Pd, and Rh in this washcoat layer amounts to 1.766 kg/m³ (1.766 g/L (50 g/cft)), 0.177 kg/m³ (0.177 g/L (5 g/cft)), and 0.177 kg/m³ (0.177 g/L (5 g/cft)). Washcoat layer B additionally contains 55 kg/m³ (55 g/L) cerium oxide with a washcoat loading of layer B of 101 kg/m³ (101 g/L).

The catalyst thus obtained is referred to below as K1.

EXAMPLES 2 through 6

Example 1 was repeated with the difference that the quantities of cerium oxide or noble metals specified in Table 1 below were used. The catalysts thus obtained are called K2 through K6.

TABLE 1

| Catalyst | Cerium oxide Washcoat A [kg/m³ (g/L)] | Cerium oxide Washcoat B [kg/m³ (g/L)] | Cerium oxide ratio/B/A | (Pt + Pd) concentration B/A |
|---|---|---|---|---|
| K1 | 125 | 55 | 1/2.27 | 2.98/1 |
| K2 | 150 | 30 | 1/5.00 | 4.30/1 |
| K3 | 110 | 110 | 1/1.00 | 1.83/1 |
| K4 | 152.8 | 67.2 | 1/2.27 | 2.91/1 |
| K5 | 110 | 22 | 1/5.00 | 4.22/1 |
| K6 | 180 | 60 | 1/3.00 | 3.36/1 |

Determination of the NOx Conversion of K1
a) K1 was first aged for 16 h at 800° C. in a hydrothermal atmosphere.
b) The NOx conversion of the catalyst K1 according to the invention as a function of the temperature upstream of the catalyst was determined in a model gas reactor in the so-called NOx conversion test.

In this test, synthetic exhaust gas with a nitrogen monoxide concentration of 500 ppm, respectively 10 vol % carbon dioxide and water, a concentration of 50 ppm of a short-chained hydrocarbon mixture (consisting of 33 ppm propene and 17 ppm propane), as well as a residual oxygen content of 7 vol %, is guided over the respective catalyst sample in a model gas reactor at a space velocity of 50 k/h, wherein the gas mixture alternately contains excess oxygen for 80 s ("lean" gas mixture with an air/fuel ratio λ of 1.47), during which time nitrogen oxides are stored, and exhibits an oxygen deficit for 10 s for regenerating the catalyst sample ("rich" gas mixture with an air/fuel ratio λ of 0.92; by admixing 5.5 vol % carbon monoxide while simultaneously reducing the residual oxygen content to 1 vol %).

In the process, the temperature is reduced by 7.5° C./min from 600° C. to 150° C., and the conversion during each 90-second-long lean/fat cycle is determined.

The NOx regeneration capacity at 200° C. is important, in order to model the driving behavior in urban areas, and at 450° C. for freeway driving. In order to fulfill the Euro 6 emission standard, it is, in particular, important in this respect to show a high NOx regeneration capacity across this entire temperature range.

FIG. 1 shows the thus determined NOx conversion, of the catalyst 1 according to the invention. Accordingly, the conversion is 54% at 200° C. and 74% at 450° C.

The invention claimed is:

1. Nitrogen oxide storage catalyst composed of at least two catalytically active washcoat layers on a support body, wherein
   a lower washcoat layer A contains cerium oxide in a quantity of 110 to 180 kg/m³ (110 to 180 g/L) in relation to the volume of the support body, an alkaline earth metal compound and/or an alkali metal compound, as well as platinum and palladium;
   an upper washcoat layer B disposed atop the washcoat layer A contains cerium oxide, as well as platinum and palladium, and no alkali metal or alkaline earth metal compounds;
   the ratio of the cerium oxide in washcoat layer A to the cerium oxide in washcoat layer B is greater than 1:1 up to 5:1, wherein the total quantity of cerium oxide in washcoat layer A and washcoat layer B, calculated in kg/m³ (g/L) and in relation to the volume of the support body, is 132 to 240 kg/m³ (132 to 240 g/L);
   the ratio Pt:Pd in washcoat layer A and washcoat layer B is equal, and the ratio Pt:Pd amounts to 2:1 to 20:1;
   the total quantity of platinum and palladium, calculated respectively in kg/m³ (g/L) and in relation to the volume of the support body, in washcoat layer A and washcoat layer B is equal; and
   the ratio of the concentrations of platinum and palladium in washcoat layer A to platinum and palladium in washcoat layer B, respectively in relation to the total mass of the respective washcoat layer, is 1:1 to 1:5, and
   wherein the quantity of cerium oxide in lower washcoat layer A exceeds the quantity of alkaline earth metal oxide or alkali metal oxide in lower washcoat layer A.

2. Nitrogen oxide storage catalyst according to claim 1, wherein the washcoat layer B contains cerium oxide in a quantity of 22 to 120 kg/m³ (22 to 120 g/L).

3. Nitrogen oxide storage catalyst according to claim 1, wherein the washcoat layer A contains cerium oxide in a quantity of 110 to 160 kg/m³ (110 to 160 g/L).

4. Nitrogen oxide storage catalyst according to claim 1, wherein the total washcoat loading of the support body is 300 to 600 kg/m³ (300 to 600 g/L) in relation to the volume of the support body.

5. Nitrogen oxide storage catalyst according to claim 4, wherein the loading with washcoat layer A is 150 to 500 kg/m³ (150 to 500 g/L), and the loading with washcoat layer B is 50 to 300 kg/m³ (50 to 300 g/L), respectively in relation to the volume of the support body.

6. Nitrogen oxide storage catalyst according to claim 4, wherein the loading with washcoat layer A is 250 to 300 kg/m³ (250 to 300 g/L), and the loading with washcoat layer B is 50 to 150 kg/m³ (50 to 150 g/L), respectively in relation to the volume of the support body.

7. Nitrogen oxide storage catalyst according to claim 1, wherein the ratio of platinum to palladium is 4:1 to 18:1.

8. Nitrogen oxide storage catalyst according to claim 1, wherein the ratio of platinum to palladium is 6:1 to 16:1.

9. Nitrogen oxide storage catalyst according to claim 1 wherein washcoat layer A and/or washcoat layer B contain rhodium.

10. Nitrogen oxide storage catalyst according to claim 9, wherein rhodium is provided in quantities of 0.003 to 0.35 kg/m³ (0.003 to 0.35 g/L) in relation to the volume of the support body.

11. Nitrogen oxide storage catalyst according to claim 1, wherein the alkaline earth metal compound in washcoat layer A is magnesium oxide, barium oxide, and/or strontium oxide.

12. Nitrogen oxide storage catalyst composed of least two catalytically active washcoat layers on a support body, wherein
- a lower washcoat layer A contains cerium oxide in a quantity of 110 to 180 kg/m³ (110 to 180 g/L) in relation to the volume of the support body, an alkaline earth metal compound and/or an alkali metal compound, as well as platinum and palladium; an upper washcoat layer B disposed atop the washcoat layer A contains cerium oxide, as well as platinum and palladium, and no alkali metal or alkaline earth metal compounds; the ratio of the cerium oxide in washcoat layer A to the cerium oxide in washcoat layer B is 1:1 to 5:1, wherein the total quantity of cerium oxide in washcoat layer A and washcoat layer B, calculated in kg/m³ (g/L) and in relation to the volume of the support body, is 132 to 240 kg/m³ (132 to 240 g/L);
- the ratio Pt:Pd in washcoat layer A and washcoat layer B Is equal, and the ratio Pt:Pd amounts to 2:1 to 20:1;
- the total quantity of platinum and palladium, calculated respectively in kg/m³ (g/L) and in relation to the volume of the support body, in washcoat layer A and washcoat layer B is equal; and
- the ratio of the concentrations of platinum and palladium in washcoat layer A to platinum and palladium in washcoat layer B, respectively in relation to the total mass of the respective washcoat layer, is 1:1 to 1:5, and wherein the nitrogen oxide storage catalyst comprises
  - a lower washcoat layer A that contains
    - cerium oxide in a quantity of 100 to 160 kg/m³ (100 to 160 g/L),
    - platinum and palladium in a ratio of 10:1, as well as magnesium oxide and/or barium oxide: and
  - an upper washcoat layer B that is disposed atop the washcoat layer A and contains
    - no alkaline earth metal compound and no alkali metal compound,
    - platinum and palladium in a ratio of 10:1, as well as cerium oxide in a quantity of 45 to 65 kg/m³ (45 to 65 g/L), wherein washcoat layer A is provided in quantities of 250 to 350 kg/m (250 to 350 g/L), and washcoat layer B is provided in quantities of 80 to 130 kg/m (80 to 130 g/L), wherein the specification of quantity kg/m (g/L) respectively relates to the volume of the support body, and wherein the quantity of cerium oxide in lower washcoat layer A exceeds the quantity of alkaline earth metal oxide or alkali metal oxide in lower washcoat layer A.

13. Method of converting NOx in exhaust gases of motor vehicles that are operated with lean-burn engines, wherein the exhaust gas is guided over a nitrogen oxide storage catalyst composed of at least two catalytically active washcoat layers on a support body, wherein
- a lower washcoat layer A contains cerium oxide in a quantity of 110 to 180 kg/m³ (110 to 180 g/L) in relation to the volume of the support body, an alkaline earth metal compound and/or an alkali metal compound, as well as platinum and palladium;
- an upper washcoat layer B disposed atop the washcoat layer A contains cerium oxide, as well as platinum and palladium, and no alkali metal or alkaline earth metal compounds;
- the ratio of the cerium oxide in washcoat layer A to the cerium oxide in washcoat layer B is equal to or greater than 2.27:1 up to 5:1, wherein the total quantity of cerium oxide in washcoat layer A and washcoat layer B, calculated in kg/m³ (g/L) and in relation to the volume of the support body, is 132 to 240 kg/m³ (132 to 240 g/L);
- the ratio Pt:Pd in washcoat layer A and washcoat layer B is equal, and the ratio Pt:Pd amounts to 2:1 to 20:1;
- the total quantity of platinum and palladium, calculated respectively in kg/m³ (g/L) and in relation to the volume of the support body, in washcoat layer A and washcoat layer B is equal; and
- the ratio of the concentrations of platinum and palladium in washcoat layer A to platinum and palladium in washcoat layer B, respectively in relation to the total mass of the respective washcoat layer is 1:1 to 1:5, and wherein the quantity of cerium oxide in lower washcoat layer A exceeds the quantity of alkaline earth metal oxide or alkali metal oxide in lower washcoat layer A.

14. Nitrogen oxide storage catalyst according to claim 1, wherein the alkaline earth metal compound in washcoat layer A is selected from the group consisting of magnesium oxide, barium oxide, strontium oxide, and mixtures thereof.

15. Nitrogen oxide storage catalyst according to claim 1, wherein the cerium oxide quantity in lower washcoat layer A is greater than the cerium oxide quantity in upper washcoat layer B by a ratio of 2.27:1 up to 5:1; and wherein the ratio of the concentrations of platinum and palladium in washcoat layer A to platinum and palladium in washcoat layer B, respectively in relation to the total mass of the respective washcoat layer, is greater than 1.83:1 and at or below 4.3:1.

16. Nitrogen oxide storage catalyst according to claim 1, wherein the nitrogen storage catalyst provides for NOx conversion removal of 54% or higher in a temperature range of 200 degrees Celsius to 500 degrees Celsius, wherein the nitrogen storage catalyst provides for maximum NOx conversion removal within a range of 350 to 375 degrees Celsius, and wherein the nitrogen storage catalyst provides for a conversion of 50% below 200 degrees Celsius.

17. Nitrogen oxide storage catalyst according to claim 1, wherein lower washcoat layer A contains cerium oxide in a quantity of 125 to 145 kg/m$^3$ (125 to 145 g/L) and upper washcoat layer B contain cerium oxide in a quantity of 40 to 100 kg/m$^3$ (40 to 100 g/L).

18. Nitrogen oxide storage catalyst according to claim 1, wherein the quantity of alkaline earth metal oxide or alkali metal oxide in lower washcoat layer A is less than the amount of cerium oxide in upper washcoat B.

19. Nitrogen oxide storage catalyst according to claim 18, wherein lower washcoat layer A contains 10 to 50 kg/m$^3$ (15 to 50 g/L) alkaline earth metal oxide or alkali metal oxide.

* * * * *